Figure 10:
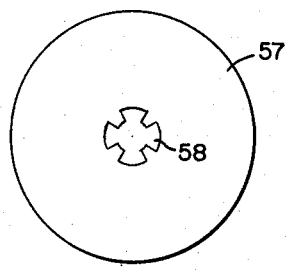

Dec. 1, 1964     M. SCHWARTZ ETAL     3,159,078
DEVICE FOR VIEWING A PHOTOGRAPHIC SLIDE AND REPRODUCING
INTELLIGENCE ASSOCIATED THEREWITH
Original Filed July 9, 1954     6 Sheets-Sheet 1
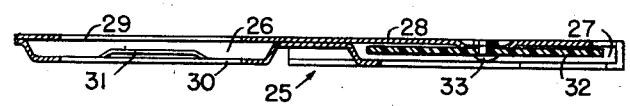
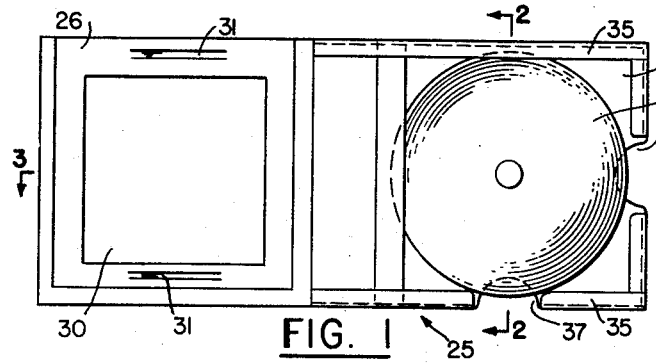
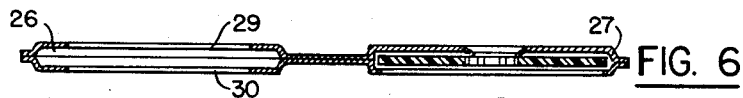
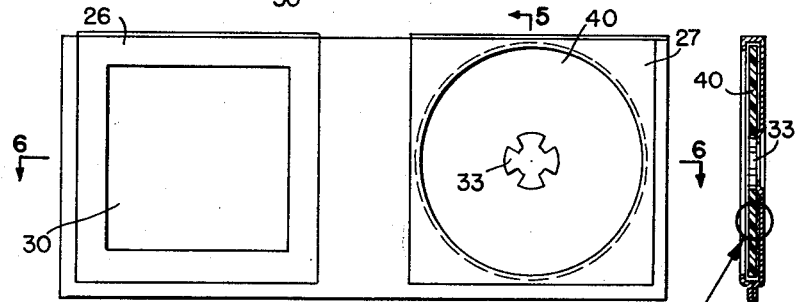
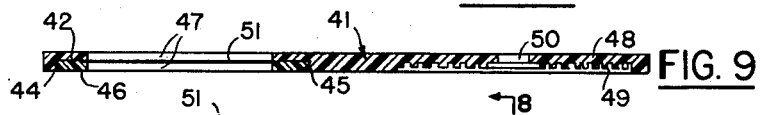
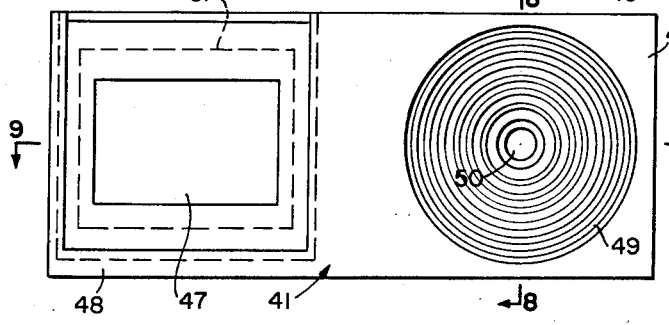
*INVENTORS*
MORRIS SCHWARTZ
EDWARD K. KAPRELIAN
BY
ATTORNEY Dec. 1, 1964    M. SCHWARTZ ETAL    3,159,078
DEVICE FOR VIEWING A PHOTOGRAPHIC SLIDE AND REPRODUCING
INTELLIGENCE ASSOCIATED THEREWITH
Original Filed July 9, 1954    6 Sheets-Sheet 2

INVENTORS
MORRIS SCHWARTZ
EDWARD K. KAPRELIAN
BY
ATTORNEY

INVENTORS
MORRIS SCHWARTZ
EDWARD K. KAPRELIAN
BY

ATTORNEY

FIG. 21

FIG. 22

INVENTORS
MORRIS SCHWARTZ
EDWARD K. KAPRELIAN
BY

ATTORNEY

INVENTORS
MORRIS SCHWARTZ
EDWARD K. KAPRELIAN
BY
ATTORNEY

United States Patent Office 3,159,078
Patented Dec. 1, 1964

3,159,078
DEVICE FOR VIEWING A PHOTOGRAPHIC SLIDE AND REPRODUCING INTELLIGENCE ASSOCIATED THEREWITH
Morris Schwartz and Edward K. Kaprelian, Plainville, Conn., assignors to The Kalart Company, Inc., Plainville, Conn.
Original application July 9, 1954, Ser. No. 442,362, now Patent No. 2,961,922, dated Nov. 29, 1960. Divided and this application Sept. 14, 1960, Ser. No. 59,136
10 Claims. (Cl. 88—28)

The present invention relates to means for rendering the viewing of photographic transparencies or slides more informative and enjoyable.

The present application is a division of application Serial Number 442,362 filed July 9, 1954 and now matured into Patent 2,961,922 issued November 29, 1960.

Photographic slides may be directly viewed through a viewer or projected by means of a projector. The invention is primarily concerned with the latter method of showing slides which is generally the more effective one.

While a projected slide image, as any picture, is to a certain extent self-explanatory, additional information or comment pertaining to the slide image is often necessary or at least desirable. This is not only true for slide images of technical, scientific or promotional nature but also for slides of more personal interest. The enjoyment of viewing slides will often be greatly enhanced by an accompanying comment on the situation or location depicted on the slide.

While movie film with sound track is well known, both for amateur and professional use, there are not available as far as the applicant is aware, any means for directly associating a slide or other still photograph with a recorded sound message.

Accordingly, one of the principal objects of the invention is to provide novel and improved means associating a slide and a sound track carrier for simultaneous projection and sound reproduction respectively.

A more specific object of the invention is to provide common holder means for holding a slide and a sound track carrier in position for simultaneous projection and sound reproduction respectively.

Another principal object of the invention, allied with the preceding ones, is to provide a novel device including projecting means and sound reproducing means and arranged to receive a slide and sound track holder according to the invention for simultaneously projecting the slide and reproducing the intelligence recorded on the sound track carrier.

A more specific object of the invention is to provide a novel slide projecting and sound reproducing device in which an inserted slide and sound track holder is automatically retained in the proper operational position for projection and sound recording and/or reproduction respectively.

Another more specific object of the invention is to provide a novel slide projecting and sound reproducing device including means automatically readying the sound head of the device for reproduction upon insertion and retention of a holder according to the invention in its operational position.

The term "slide" as used herein, is intended to encompass single picture slides and stereoscopic slides, both for black and white and for color projection.

Further objects, features and advantages of the invention will be pointed out hereinafter and set forth in the appended claims forming part of the application.

In the accompanying drawings several preferred embodiments of the invention are shown by way of illustration and not by way of limitation.

Figure 11:
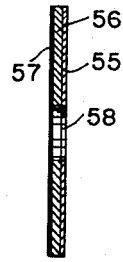
Figure 14:
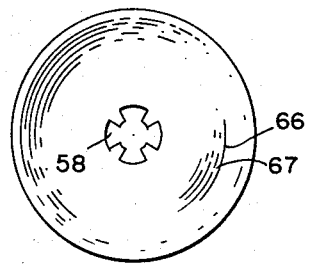
Figure 12:
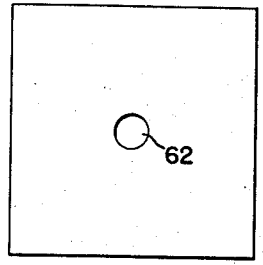
Figure 13:
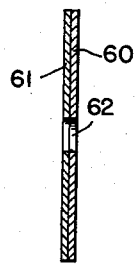
Figure 15:
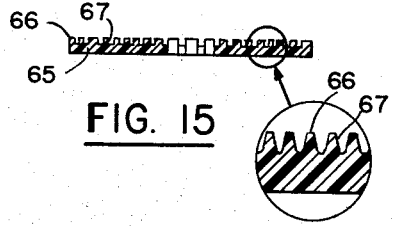
Figure 20:
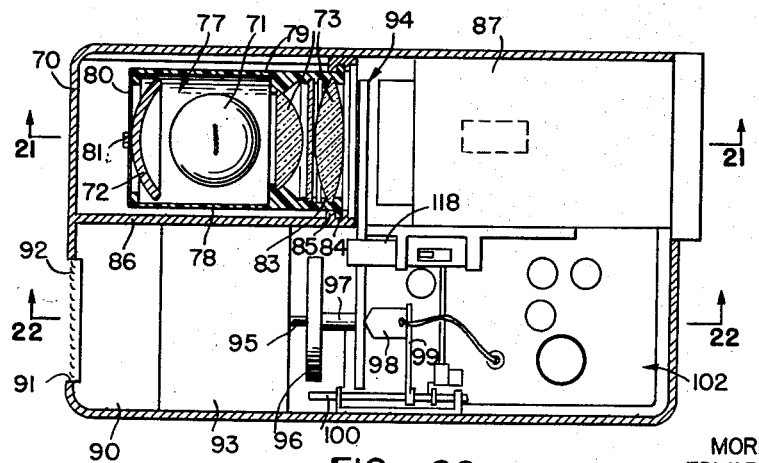
Figure 16:
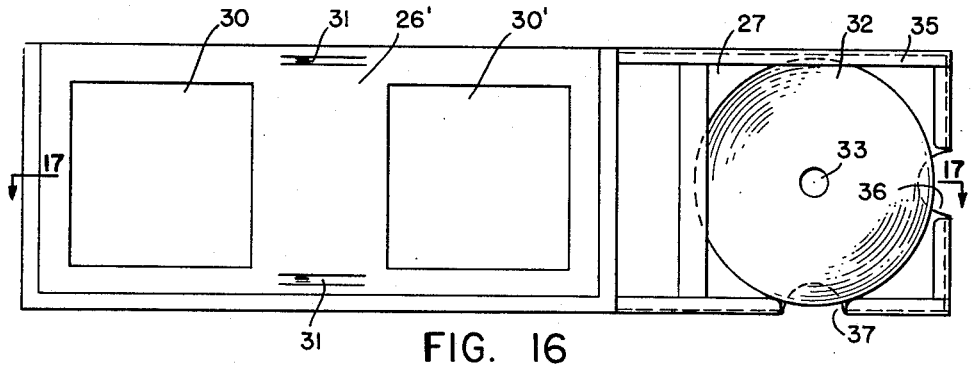
Figure 17:
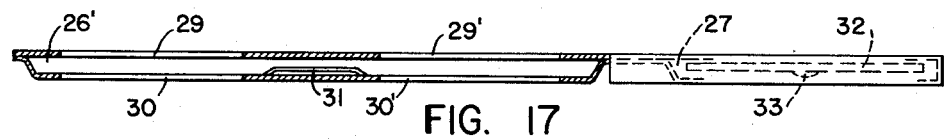
Figure 18:
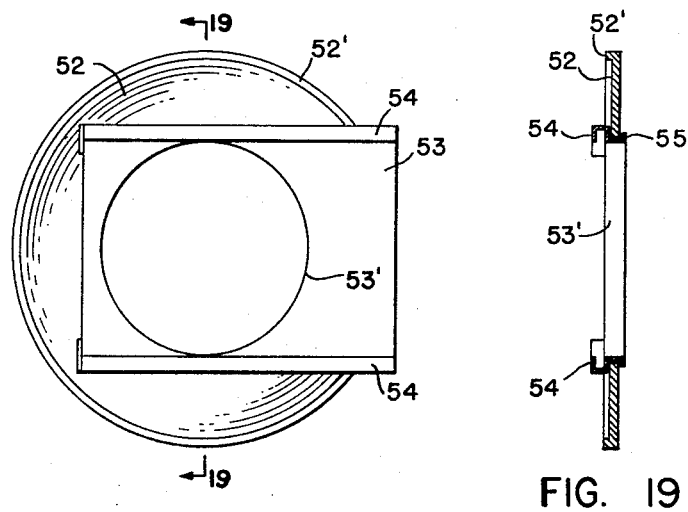
Figure 19:
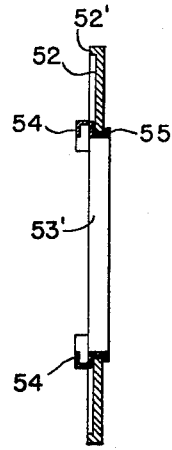
Figure 23:
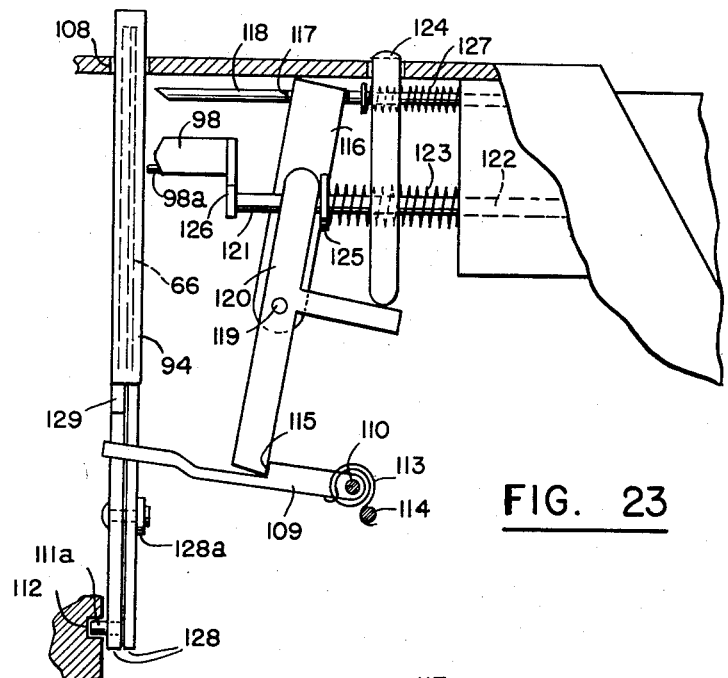
Figure 24:
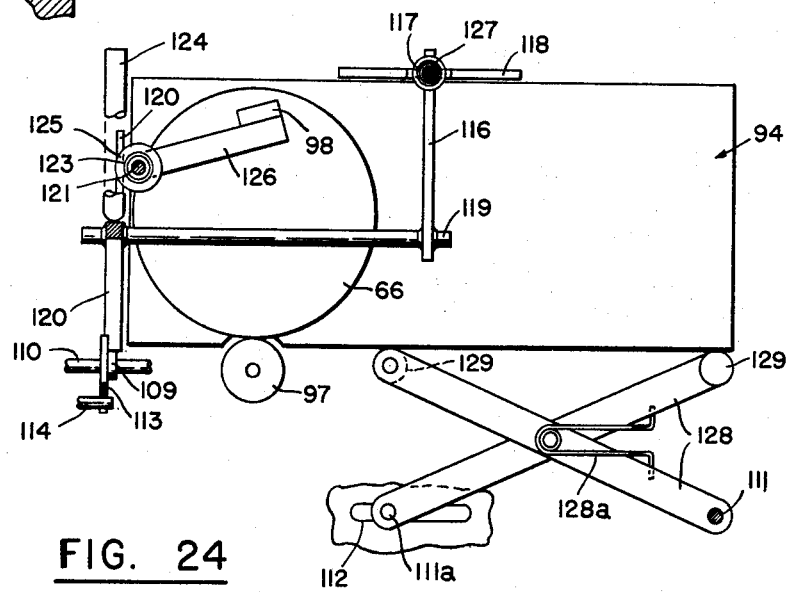
Figure 25:
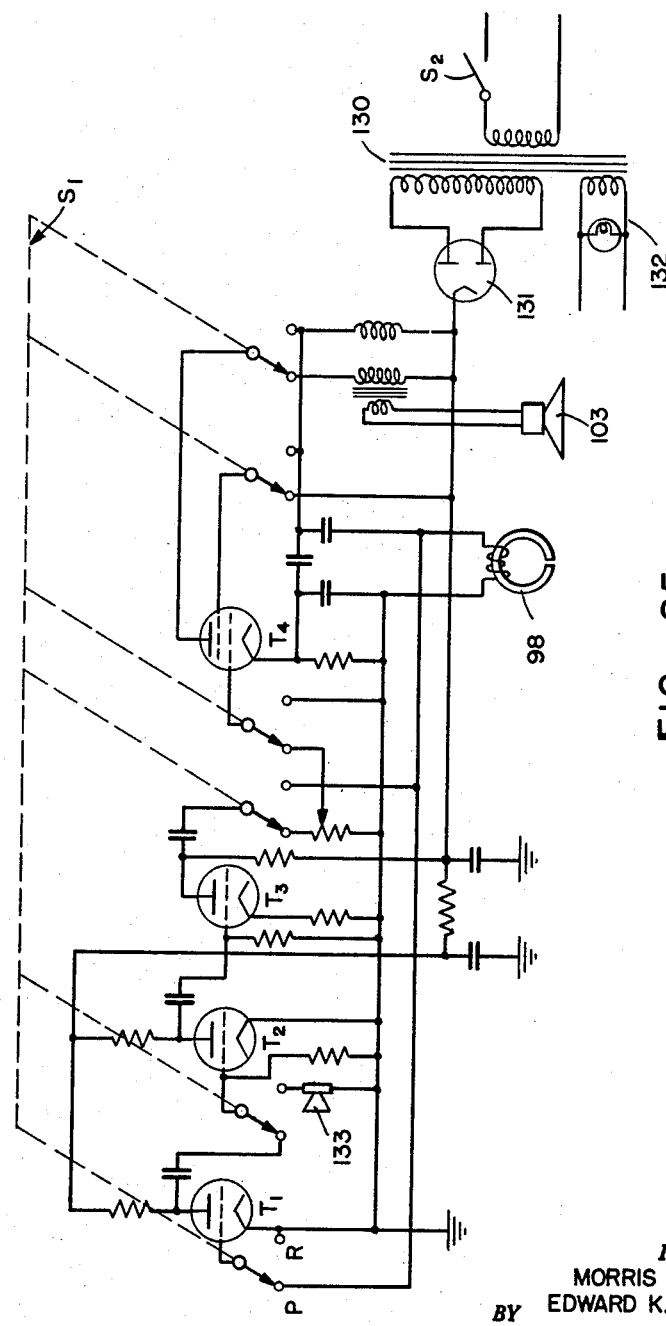

In the drawings:
FIG. 1 is a plan view of a holder for a slide and a record disc.
FIG. 2 is a section taken on line 2—2 of FIG. 1.
FIG. 3 is a section taken on line 3—3 of FIG. 1.
FIG. 4 is a plan view of a modification of the slide and record disc holder of FIG. 1.
FIG. 5 is a section taken on line 5—5 of FIG. 4.
FIG. 6 is a section taken on line 6—6 of FIG. 4.
FIG. 7 is a plan view of a holder, part of which constitutes a sound track carrier.
FIG. 8 is a section taken on line 8—8 of FIG. 7.
FIG. 9 is a section taken on line 9—9 of FIG. 7.
FIG. 10 is a plan view of a sound track carrier insertable in a holder according to the invention.
FIG. 11 is a diametrical section of FIG. 10.
FIG. 12 is a plan view of a different kind of a sound track carrier insertable in a holder according to the invention.
FIG. 13 is a section of FIG. 12.
FIG. 14 is a plan view of still another sound track carrier insertable in a holder according to the invention.
FIG. 15 is a diametric section of FIG. 14.
FIG. 16 is a plan view of a holder according to the invention designed for receiving a stereoscopic slide and a record disc.
FIG. 17 is a section taken on line 17—17 of FIG. 16.
FIG. 18 is a plan view of a modified holder.
FIG. 19 is a section taken on line 19—19 of FIG. 18.
FIG. 20 is a plan sectional view of a slide projecting and sound reproducing device designed to receive a holder according to the invention for simultaneous projection of a slide and reproduction of a sound track supported by the holder.
FIG. 21 is an elevational sectional view taken on line 21—21 of FIG. 20.
FIG. 22 is an elevational sectional view taken on line 22—22 of FIG. 20.
FIG. 23 is a fragmentary view of FIG. 22 showing the holder control mechanism of the device in a different operational position.
FIG. 24 is a fragmentary front view of FIG. 23, and
FIG. 25 is a diagrammatic circuit system of the electronic equipment of the sound reproducing and/or recording part of the devices according to FIGS. 20 to 24 inclusive.

The holders according to FIGS. 1 to 19 inclusive, have in common that each of the holders shown in the respective figures provides means for supporting a slide, either of the single picture type or the stereoscopic type, and a sound track carrier in a spatial relationship such that upon insertion of the holder in an appropriately designed device, the slide and the sound track are held in operational positions for simultaneously projecting the slide and reproducing the intelligence recorded by the sound track. As explained before, such an arrangement according to the invention causes in effect the slide to tell its own story when it is projected thereby giving the showing of slides a new impetus and making it more interesting and informative.

Referring first to FIGS. 1, 2 and 3 in detail, the holder according to these figures comprises a frame 25 made as shown of sheet metal or any other suitable material such as plastic. The frame has a slide or transparency receiving portion 26 and a sound track receiving portion 27. To form these portions, the frame may be dished and the resulting shallow pockets are closed with a back plate 28. The space in frame portion 26 is open at the long edges of the frame to permit the insertion of a slide into said space. Windows 29 and 30 serve to permit projection of a slide inserted in frame portion 26. The slide may be visualized as a conventional slide in which the film proper is mounted in an appropriate frame made for instance of cardboard. The slide is retained in the frame by the margin of the slide frame extending between the respective wall portions of frame 25. The slide may further be releasably retained in frame portion 26 by providing leaf springs 31.

The sound track which is received by frame portion 27 is shown as a record disc 32. This disc may be visualized as being made of or including magnetic sound recording material on which the desired intelligence is magnetically recorded. Appropriate discs will be more fully described hereinafter. The disc is rotatable about a pin 33 extending through the front of holder 27. The opposite back portion of disc holder 27 is provided with an appropriate depression 34 which acts as a bearing at the rear center of the disc to reduce friction between the disc and back plate 28. As can best be seen in FIG. 1, the disc partly underlies turned over flanges 35 of the frame. It may be centrally rotated or by means of a roller engaging the periphery of the disc. To permit such engagement, holder portion 27 is cut out at 36 and 37.

As appears from the previous description and the figures, the holder supports the slide and the disc in a side-by-side position and permits insertion of the holder with the slide and the disc in such position in one of the devices as shown in FIGS. 20 to 24 inclusive.

The holder according to FIGS. 4 and 5 is similar in principle to the previously described holder.

The holder again comprises a slide receiving portion 26 and a disc receiving portion 27.

The slide receiving portion 26 forms a pocket for insertion of a slide which may be projected through windows 29 and 30. The recording disc 40 is confined by edges of holder portion 27 but is otherwise free. It rotates about pin 33.

The disc may be a disc for magnetic sound recording as has been described in connection with FIGS. 1 to 3 but it may also be a disc in which the sound is recorded by cutting of grooves as indicated by the insert drawing associated with FIG. 5. Similarly a disc employing recording grooves may also be employed in connection with the holder according to FIGS. 1 to 3.

As is apparent, the holder according to FIGS. 4 to 6 retains the slide and the recording disc in a side-by-side position in the same manner as the holder of FIGS. 1 to 3.

The holder according to FIGS. 7, 8 and 9 is shown as a single piece frame 41 made of plastic as indicated or of sheet metal. The slide supporting portion 42 of the frame is formed with preferably dove-shaped grooves 44 and 45 for slidably receiving and retaining an apertured cover piece 46. A window 47 permits projection of an inserted piece of film 51.

The sound track supporting portion 48 of the frame is integrated with the sound recording and reproducing surface by forming the said surface directly on frame portion 48. The recording surface may be a magnetizable layer formed with guide grooves 49. A guide hole 50 may be provided to facilitate locating of the holder in the slide projecting and sound reproducing device. In this arrangement, the sound recording and reproducing head rotates whereas the recording surface 48 is held stationary.

FIGS. 10 and 11 show a recording disc as may be used with either of the holders according to FIGS. 1 to 4 or with one of the holders shown in FIGS. 16 to 19 inclusive to be described hereinafter.

The disc according to FIGS. 10 and 11 comprises a non-magnetic metallic base 55, a resilient layer 56 which may be made of felt, paper, rubber, rubber composition or suitable plastic and a magnetizable layer 57 made for instance of suitable oxide sheeting. The three layers are cemented or otherwise bonded together, intermediate layer 56 forming a cushion for the sound carrying layer 57. A guide hole 58 which may be in form of a Maltese cross, serves to seat the record pin upon a drive shaft.

FIGS. 12 and 13 show a square shaped recording plate which comprises a non-magnetic base 60 preferably made of aluminum or plastic to which is cemented or bonded a layer 61 made of suitable rubber or plastic impregnated with particles of magnetic material. A guide hole 62 serves to locate the plate in the holder.

The recording disc according to FIGS. 14 and 15 comprises a suitable molded plastic base 65 carrying a recording oxide surface 66 in which are formed guide grooves 67. The disc is provided with a Maltese cross shaped drive opening 58.

The holder according to FIGS. 16 and 17 is similar in principle to the holder according to FIGS. 1, 2 and 3, except that it is designed for a stereoscopic slide. Accordingly, the slide supporting frame portion 26' is broadened to accommodate two pairs of windows 29, 30 and 29' and 30' for the two pictures of a stereoscopic slide. The arrangement of the holder and its function are obvious from the description of the holder according to FIG. 1.

The holder shown in FIGS. 18 and 19 employs an annular disc 52 carrying a magnetic recording surface and provided with a flange 52'. The disc is free to revolve about a slide holder part 53 provided with a central opening 53' through which light is projected. Flanges 54 retain an inserted transparency holder in proper position. A flange 55 formed from the rear of holder part 53 holds the disc in correct relation. In use, this holder functions essentially similarly to those previously described. The holder is retained in the projector aperture by any suitably locating surface such as the outer portions of flanges 54. The disc is driven preferably by a friction roller which engages the periphery of flange 52'.

As previously mentioned, all the aforedescribed holders and recording discs therefor are designed for coaction with a slide projecting and sound reproducing device. Such devices will now be described in connection with FIGS. 20 to 25 inclusive.

Referring first to FIGS. 20 and 21, the device according to these figures comprises a light projecting part and a sound reproducing part encased in a housing 70 of suitable shape.

The light projecting part includes a lamp 71 of the type used in projectors, a reflector mirror 72, condenser lenses 73 and a projection lens system 74 preferably formed by five components. The lamp is mounted in a socket 75 which in turn is attached to the base 70' of the housing by a socket support 76. The mirror 72 and the condenser lenses are mounted in a common support frame 77 which is preferably die cast. The support comprises two side arms 78 and 79 straddling lamp 71. A metal strip 80 attached to arms 78 and 79 supports mirror 72 secured thereto by any suitable means such as a screw 81. The forward part 82 of the support is formed with internal grooves 83 in which are fitted the condenser lenses. A suitable holder for the picture and sound record area as previously described is attached to housing 70 by engagement with a groove 84 at the forward portion of the lamp housing. A partition wall 86 of the housing serves to separate the light projecting part of the device from the sound reproducing part thereof. This arrangement permits to remove the holder and the parts supported thereby as a unitary structure, for instance, for the purpose of cleaning.

The projecting lens system is mounted on an axially adjustable barrel 87 for purpose of focusing. The means for focusing the lens system are well understood in the art and a detailed illustration and description thereof are not essential for the understanding of the invention.

The sound reproducing part of the device occupies the right hand and lower part of the housing as seen in the direction of projection according to FIG. 20. This part of the housing also includes a fan 90 for providing cooling air to dissipate the heat generated by lamp 71 and the heat generating parts of the sound reproducer. Cooling air is drawn in through a ventilating opening 91 covered with a grill guard 92 or louvered. Fan 90 is driven by a motor 93 which also drives the recording disc inserted in a combination holder of the hereinbefore described kind. The holder is generally designated by 94. It should be visualized as supporting in the position shown in FIGS. 20, 21 and 22, a slide in optical alignment with the optical system of the light projector and a record disc as shown, for instance, in FIGS. 14 and 15.

The drive for the recording disc is derived from the motor through the motor drive shaft 95, a speed reducing and governor wheel 96 and a drive spindle 97.

The surface of the disc carrying the recorded intelligence is engaged by a magnetic sound head 98 of conventional design. The sound head is supported by an arm 99 which is supported pivotally and axially slidable on a bar 100 to permit the required movements of the sound head relative to the revolving disc. The movements of the sound head relative to the disc are controlled by a guide pin riding in groove 67, or may be controlled in any conventional manner, a detailed description of such a control not being essential for the understanding of the invention. The holder is releasably retained in the position shown in FIGS. 20 and 21 by a slide lock 118, a design of which is more fully shown in FIGS. 22 and 23 and which will be described in detail in connection with these figures. The sound head is connected to an audio amplifier generally designated by 102. The amplifier is basically similar to amplifiers of the type used in magnetic tape recorders. It provides the electronic components and the circuitry for magnetically recording intelligence on the disc and for playing back the recorded intelligence through a speaker 103. The amplifier may also provide the high frequency and current necessary for erasing the magnetization of the disc to ready the same for a new recording.

Motor shaft 95 drives speed reduction wheel 96 through frictional engagement therewith. For this purpose, the periphery of shaft 95 and/or wheel 96 may be provided with a rubber or similar resilient tire. Wheel 96 is seated upon a shaft 97 journalled in a bearing bracket 107 secured for instance, to the motor housing. Shaft 97 forms the drive spindle for a recording disc inserted in holder 94 and carries on its end a rubber drive surface which engages for this purpose the periphery of the disc as has been explained in connection with FIGS. 1, 2 and 3.

By selecting a suitable ratio of transmission between the recording disc and the motor shaft, the disc can be driven with any desired rotational speed. It has been found practical to record intelligence on the disc at a recording speed of between 1½ inch and 3 inch per second. The recording time and hence the play back time depend of course upon the available recording area; generally a play back time of 20 to 60 seconds is sufficient for an explanatory message.

The combination holder 94 can be inserted into housing 70 and withdrawn therefrom through a slot 108.

The mechanism for releasably locking the slide in position comprises a locking lever 109 pivoted by means of a pivot pin 110 to a suitable part within the housing for instance, to the top of the amplifier casing. The distal end of the lever which may be cranked, serves as an abutment for holder 94 and is urged in clockwise direction by a spring 113 which is secured by a pin 114 attached to the same bracket as pivot pin 110. Lever 109 is shouldered at 115. This shoulder is engaged by the lower arm of a crank 120 supported on a shaft 119 suitably mounted within the housing. Shaft 119 also serves to support a latch lever 116 which engages a sliding lock bar 118 by means of a slot 117. The sliding lock bar is suitably supported at one end within the housing cover and is urged forward by a coil spring 127 which rests against the housing cover at one end and within a cut out portion of bar 118 at the other. A spring 127 urges bar 118 to the left and also rotates lever 116 which is engaged by slot 117, in a counterclockwise direction. This motion, in turn, is transmitted through shaft 119 to crank 120. The second arm of crank 120 engages a bracket 125 mounted on a bar 121—the latter being both rotatable and axially slidable in a bearing 122 suitably secured within the housing. The sound head 98 is attached to a crank 126 mounted on bar 121. Bar 121 is urged forward by a coil spring 123 resting between bracket 125 and bearing 122 thereby urging sound head 98 against the recording disc. A third arm of crank 120 coacts with a release plunger 124 as shown. Positioned in the same vertical plane as the slide carrier 94 and adapted to be moved downwardly by the slide carrier is a spring support comprising a pair of levers 128 which are urged in an upward direction by the action of a spring 128a. The lower end of one lever is pivoted in the casing by means of pin 111 while a similar pin 111a at the lower end of the other lever slides in a slot 112.

The locking mechanism just described functions as follows:

Let it be assumed that all the parts of the locking mechanism are in the position of FIG. 23 and that it is desired to insert a holder 94 and lock the same in position. For this purpose the holder is dropped in slot 108. The upper end of the holder which is still protruding as shown in FIG. 23 is depressed against the upwardly urging action of levers 128 and lever 109. Hence, the lower arm of crank 120 becomes disengaged from shoulder 115 and assumes the position shown in FIG. 22. Spring 127 is now released and moves lock bar 118 into a position overlying holder 94, assuming the latter is sufficiently depressed. Lock bar 118 simultaneously urges lever 116 in counterclockwise direction. Crank 120 follows the rotation of lever 116 thereby permitting the spring 123 to urge bar 121 and sound head 98 toward the recording disc. All the components of the locking mechanism now occupy the position of FIG. 22 in which sound head 98 engages the recording disc and bar 118 retains the holder in position against the action of spring 113.

In this particular embodiment, the recording disc employed is one which carries guiding grooves as shown in FIGS. 14 and 15. These grooves are spiral shaped and serve as to guide sound head 98 by means of a guide pin 98a on the head which engages the grooves. At the end of the playing time, the pin rides in a circular groove near the periphery of the disc and continues to ride in this groove until the release plunger is depressed whereupon the head is withdrawn from the disc. The head now drops by gravity or through the urging of a spring into a downward position from which it is ready to be brought into contact with the innermost groove of a newly inserted disc or of the same disc if its reproduction is to be repeated.

If desired, one of the movable components of the locking mechanism may operate switching means for either closing the circuit for both the light projector and the sound reproducer thereby starting both parts of the device or for closing the circuit of the sound reproducer only so that the reproduction of the message automatically starts as soon as the holder is locked in position.

To release the holder it is merely necessary to depress plunger 124 from the position of FIG. 22 into the position of FIG. 23. All the parts of the locking mechanism will then return into the position of FIG. 23. As a result, the holder is forced by lifter bar 111 into the position in which it protrudes from slot 108 so that it can be conveniently withdrawn from housing 70.

The return movements of the locking mechanism may be used in an obvious manner to interrupt the circuit system of the light projector and/or the sound reproducer.

The circuit system according to FIG. 25 may be used in connection with either one of the devices according to FIGS. 20 to 24 inclusive. The circuit system which is generally of conventional nature, comprises the necessary electronic components for both, recording and play back.

There are shown three amplifier stages including tubes $T_1$, $T_2$, and $T_3$ respectively. A tube $T_4$ serves as oscillator during recording and supplies the conventional supersonic bias signal. When the amplifier is used for play back, the tube $T_4$ constitutes a power amplifier. The switchover from recording position R to play back position P is effected by means of a gang switch $S_1$ conventional for the purpose. To prevent accidental double recording, the gang switch may be of the spring return type, with the normal position of the switch being for play back. The gang switch is shown in this position. Power is supplied to the system through a transformer 130 and a rectifier tube 131. The transformer also feeds the heater circuits of the tubes of the system as is indicated at 132. The amplifier circuit is controlled by a switch $S_2$. The system further shows a microphone 133 to be used for recording.

It is believed that the amplifier connections are apparent from the circuit diagram and that a detailed description of the circuit system is not essential for the understanding of the invention.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

We claim:

1. A slide projecting and sound reproducing device for use in connection with a common holder for supporting one photographic slide and one sound track carrier in a spatially fixed relationship, said device comprising a housing, projection unit mounted within the housing for projecting the slide, a sound reproducing unit for playback of intelligence recorded on the sound track carrier, and a frame structure stationarily mounted within the housing for receiving the holder and supporting the same stationarily in an operational position for coaction of the slide and the sound track carrier with the projection unit and sound reproducing unit respectively during operation of said units.

2. A device according to claim 1, wherein the said frame structure comprises releasable locking means for retaining the holder in the housing in said stationarily operational position.

3. A device according to claim 2, wherein the said locking means engage said holder upon insertion of the holder in said frame structure for locking the holder in the housing, and wherein the said holding means further comprise release means coacting with said locking means for releasing same upon actuation of the release means.

4. A device according to claim 3, wherein the said sound reproduction unit includes a movably mounted magnetic sound head, and wherein the said locking means and the said release means therefor are coupled with said sound head for moving the latter into its sound reproducing position upon locking operation of the locking means and out of the said position upon operation of the release means.

5. A device according to claim 1, wherein the said frame structure comprises locking means for retaining the holder in said operational position upon insertion into said frame structure, and release means coacting with said locking means for releasing the latter, the said locking means including a locking member movable into and out of a position engaging the holder for retaining the same and an actuating member movable by the holder upon insertion threof, the said actuating member being coupled with the locking member for moving the latter into its position of engagement with the holder, and the said release means including a release member coupled with the locking member for causing the latter to move into the position disengaged from the holder upon actuation of the release means.

6. A device according to claim 5, wherein the said sound reproducing unit comprises a movable sound head, coupled with said locking member for movement of the sound head into and out of said sound reproducing position in unison with the movement of said locking member into and out of its locking position.

7. A device according to claim 6 and further comprising spring means coacting with said actuating member, the said spring means being disposed for loading by the actuating member movement upon insertion of the holder in the frame structure and for release by the actuation of the release means, release of the spring means causing movement of the actuating member into a position in which the holder engaging the said member is in a position for withdrawal of the holder from the frame structure.

8. A device according to claim 7, wherein the said frame structure is formed with a wall slot for insertion and withdrawal of the holder, the said spring means, when released, holding the actuating member in a position in which a holder seated upon the actuating member protrudes from the frame structure for withdrawal of the holder therefrom.

9. A device according to claim 8, wherein catch means are interposed between the actuating member and the locking member of the locking means for locking the locking member in its locking position and the magnetic sound head in its sound reproducing position, the said catch means being releasable by operation of said release means.

10. A slide projecting and sound reproducing device for use in connection with a stationary holder having means for receiving one photographic slide and supporting a magnetizable layer for recording thereon a magnetic spiral sound track in spatially fixed relationship to said slide-receiving means, said device comprising a housing, a sound recording and reproducing unit for recording intelligence on said layer and reproducing recorded intelligence respectively, said sound unit including a recording and reproducing head rotatable about the center axis of a sound track recorded on said layer, and a frame structure stationarily mounted within the housing for receiving said holder and stationarily supporting the same in an operational position for coaction of the slide with the projection unit and of the magnetizable layer with the sound unit during operation of said units.

References Cited in the file of this patent

UNITED STATES PATENTS

| | | |
|---|---|---|
| 1,929,173 | Koch | Oct. 3, 1933 |
| 2,486,661 | Leitner | Nov. 1, 1949 |
| 2,683,390 | Steele | July 13, 1954 |
| 2,857,476 | Kleiber | Oct. 21, 1958 |